United States Patent [19]

Buljan

[11] 4,376,652

[45] Mar. 15, 1983

[54] HIGH DENSITY HIGH STRENGTH SI$_3$N$_4$ CERAMICS PREPARED BY PRESSURELESS SINTERING OF AMORPHOUS SI$_3$N$_4$ POWDER AND TI

[75] Inventor: Sergej-Tomislav Buljan, Acton, Mass.

[73] Assignee: GTE Products Corporation, Stamford, Conn.

[21] Appl. No.: 1,642

[22] Filed: Jan. 8, 1979

[51] Int. Cl.$^3$ .................. C04B 35/58; C04B 35/04; C04B 35/50
[52] U.S. Cl. .................. 501/97; 501/103; 501/122
[58] Field of Search .................. 106/73.2, 73.4, 73.5; 264/65

[56] References Cited

U.S. PATENT DOCUMENTS

| | | | |
|---|---|---|---|
| 4,025,351 | 5/1977 | Masaki | 156/73.5 |
| 4,043,381 | 8/1977 | Magdiyasni et al. | 106/73.5 |
| 4,073,845 | 2/1978 | Buljan et al. | 106/73.2 |
| 4,097,293 | 6/1978 | Komeya et al. | 106/73.2 |
| 4,102,698 | 7/1978 | Large et al. | 106/73.2 |
| 4,117,095 | 9/1978 | Komeya et al. | 106/73.5 |
| 4,145,224 | 3/1979 | Mehalchick et al. | 106/73.5 |

FOREIGN PATENT DOCUMENTS 49-128915 12/1974 Japan .................. 106/73.5

Primary Examiner—O. R. Vertiz
Assistant Examiner—Mark Bell
Attorney, Agent, or Firm—John C. Fox

[57] ABSTRACT

High purity fine particle size amorphous Si$_3$N$_4$ powder compacts may be pressureless sintered to high density by the addition of from 100 to 1000 parts per million Ti to the powder prior to compaction.

6 Claims, 1 Drawing Figure

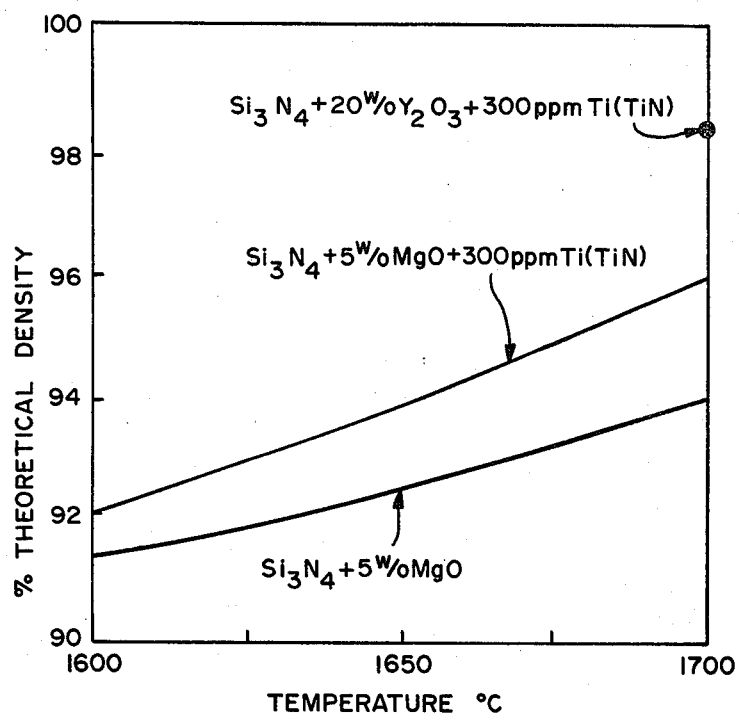

HIGH DENSITY HIGH STRENGTH SI₃N₄ CERAMICS PREPARED BY PRESSURELESS SINTERING OF AMORPHOUS SI₃N₄ POWDER AND TI

TECHNICAL FIELD

This invention relates to high density, high strength $Si_3N_4$ ceramics produced by pressureless sintering of $Si_3N_4$ green bodies, and more particularly relates to such ceramics produced from amorphous $Si_3N_4$ powder and Ti.

$Si_3N_4$ has generated considerable interest recently as a possible substitute for superalloys in applications requiring high strength at elevated temperatures and good resistance to thermal shock and corrosion, an outstanding example of which is engine components. Optimization of the physical properties of this material, particularly high temperature strength, holds out the promise of significant increases in the operating temperatures and efficiencies of turbine engines over those possible with superalloy components. Such optimization is dependent on the ability to produce bodies of high purity and high density.

Highest densities are at present obtained commercially by hot pressing powders obtained by nitridation of silicon at elevated temperatures. Such powders typically have an average particle size of about 4 microns to 10 microns and contain from 1 to several percent of impurities. See, for example, *Powder Metallurgy*, Number 8, page 148, (1961).

Copending U.S. patent application Ser. No. 625,330, filed Oct. 23, 1975, assigned to the present assignee, and now abandoned, describes a technique for producing high purity fine grain $Si_3N_4$ powder, based upon the vapor phase reaction of a silicon halide compound with ammonia. This powder possesses a purity of at least 99.9 percent, an average particle size below about 3 microns and typically below about 1 micron and an adsorbed oxygen content less than 4 percent by weight, typically less than 2 percent. In addition, the powder is characterized as being in the amorphous state.

In U.S. Pat. No. 4,073,845, issued Feb. 14, 1978, and assigned to the present assignee, there is described a technique for pressureless sintering to high densities by partly crystallizing the amorphous powder prior to compaction and sintering, or by mixing amorphous and completely crystallized powders. Such partly or completely crystallized powders are obtained by heat treating the amorphous powder in a non-reactive atmosphere at about 1400° C. to 1600° C. for one to several hours.

SUMMARY OF THE INVENTION

In accordance with the invention, it has been discovered that $Si_3N_4$ ceramics exhibiting densities and strengths previously obtainable only by hot pressing or by pressureless sintering of partly crystalline partly amorphous $Si_3N_4$ powder, may now be prepared by the pressureless sintering of green bodies of amorphous $Si_3N_4$ powder containing a small critical amount of Ti.

Starting material containing up to 5 weight percent of crystalline $Si_3N_4$ remainder substantially amorphous and 100 to 1000 parts per million consolidated to form a body of adequate green strength and density, and sintered without pressure at about 1400° to 1700° C. for at least about one hour, yields a $Si_3N_4$ ceramic body having a density of at least 90 percent of theoretical density, leading to high strength as indicated, for example, by modulus of rupture. To date, densities as high as 98 percent of theoretical density and room temperature modulus of rupture values approaching 100,000 pounds per square inch have been obtained.

BRIEF DESCRIPTION OF THE DRAWING

The FIGURE is a graph of percent theoretical density vs. firing temperature after 1.5 hours for bodies prepared with and without Ti.

DETAILED DESCRIPTION OF THE INVENTION

For a better understanding of the present invention, together with other and further objects, advantages and capabilities thereof, reference is made to the following disclosure and appended claims in connection with the above-described drawings.

The $Si_3N_4$ starting material may be amorphous material (herein the term "amorphous" referes to a short range order solid material as indicated by its lack of X-ray diffraction intensity peaks and by broad infrared absorption peaks), amorphous material which has been partly crystallized by heat treatment, or may be a mixture of substantially completely amorphous material and substantially completely crystalline material although it is to be understood that a principal advantage of the invention is that substantially completely amorphous $Si_3N_4$ powder compacts may be pressureless sintered to high density values by the addition of a small amount of Ti, thus avoiding the need for a crystallization heat treatment of the powder. The Ti may be present in elemental form or combined, e.g. as $TiO_2$, TiN, etc. As little as 100 parts per million of Ti has been found to effectively enable high density bodies by pressureless sintering. Amounts above about 1000 parts per million are in general to be avoided to avoid excessive grain growth.

The average particle size of the starting material should be below about 3 microns and preferably below about 1 micron, above which the particle size would tend to have a deleterious effect upon the strength of the sintered ceramic. Such average particle size is determined from B.E.T. surface area measurements and represents calculated effective diameter, assuming that all particles are spheres of equal diameter.

By way of example, one method suitable for obtaining amorphous $Si_3N_4$ powder of the requisite purity and particle size will be described. It is to be understood however, that any other techniques capable of yielding such starting material are also satisfactory for the practice of the invention.

The method to be described is set forth in detail in copending patent application Ser. No. 625,330, filed Oct. 23, 1975, assigned to the present assignee and now abandoned.

The reactants, $SiCl_4$ and $NH_3$, of the desired purity are introduced into the reaction apparatus at a point where the temperature is at least 1000° C. The temperature of the reaction zone should be maintained between 1100° and 1350° C.

A suitable diluent gas, provided it is of the requisite purity and is nonreactive, may be present in the reaction chamber. The gas pressure in the reaction zone should be at least atmospheric in order for the product to be produced in particulate form. Typical diluent gases include nitrogen, argon, and helium. Since the finely divided product is susceptible to oxidation, the diluent gas or other inert atmosphere or vacuum should be maintained in contact with the product until it is cooled to below at least 100° C.

The mole ratio of $NH_3$ to $SiCl_4$ should preferably be maintained within the range of 1.25 to 15.

The $NH_4Cl$ by-product may be removed from the product in a separate step by heating in a non-oxidizing atmosphere or vacuum above about 340° C., the sublimation temperature of $NH_4Cl$.

Some oxygen, typically less than about 4 weight percent of the product may also be adsorbed on the powder and may be reduced to less than about 2 percent by heating the powder in dry nitrogen or other nonreactive atmosphere.

The $Si_3N_4$ powder product obtained by the above method is characterized by an amorphous structure. Crystallization of this structure may be achieved by heating the powder in a nonreactive environment at a temperature of from about 1500° C. to 1600° C. for several hours, for example, from 3 to 8 hours.

The Ti may be added in elemental form or in combination, eg. as $TiO_2$ or TiN, and Ti in specified amounts means Ti in either the elemental or combined form, or added by simultaneous precipitation of $Si_3N_4$ and TiN in appropriate amounts through the vapor phase reaction of $SiCl_4$, $SiBr_4$ or silane and $TiCl_4$.

The $Si_3N_4$ starting material may be modified with one or more of certain well known additives, such as grain growth inhibitors or sintering aids, effective in amounts up to about 5 weight percent of the total. By way of example, sintering additives include MgO, CrN, $Y_2O_3$, $ZrO_2$, $HfO_2$, $La_2O_3$, $CeO_2$, $SiO_2$ and $Al_2O_3$.

In accordance with a preferred embodiment, the starting $Si_3N_4$ contains less than 5 weight percent crystalline material, remainder substantially amorphous material, about 100 to 200 parts per million of Ti, and up to 25 weight percent of at least one sintering additive such as MgO, or $Y_2O_3$.

The MgO is preferably added in the amount of about 2 to 5 weight percent, while $Y_2O_3$ is preferably added in the amount of about 4 to 20 weight percent. As is known, $Al_2O_3$ has a beneficial effect upon sintering although it should be kept below about 0.5 weight percent unless a post-sintering crystallization heat treatment is employed, where optimum high temperature strength is desired. See copending U.S. patent applications Ser. Nos. 916,333 and 916,334, both filed June 15, 1978, and assigned to GTE Laboratories, Inc.

The percent crystallinity of the starting material, if unknown, may be determined either by X-ray diffraction techniques, in which the intensity of the diffraction peaks of crystalline material is compared to a standard, or by infrared spectroscopy, in which the relative intensities of the broad absorption peak of the amorphous material and the narrow peaks of the crystalline material are compared.

The starting material may be processed to a green body or powder compact of adequate green strength by thoroughly mixing starting materials and any optional volatilizable additives such as forming aids or binders to provide green strength, such as by ball milling in a non-reactive liquid medium, such as toluene or methanol and consolidating the mixture such as by dry pressing, extruding, slip casting, injection molding or isostatic pressing. Processing may also optionally include a presintering or prereacting step in which either the uncompacted powder or the powder compact is heated at moderate temperatures such as from about 500° to 1000° C. in order to remove volatile binder materials and/or to partially react the starting ceramic materials. Sintering is carried out without pressure at a temperature of from about 1400° to 1700° C. for at least about one hour and preferably between 1600° and 1700° C. for about 1½ to 5 hours. Sintering should of course be carried out in a nonreactive atmosphere in order to prevent formation of undesirable oxide or oxynitride phases. As is known, an atmosphere of nitrogen tends to suppress volatization of $Si_3N_4$ during sintering. As used herein, the term "pressureless sintering" means sintering without the application of solid or liquid pressure, but is not intended to exclude sintering in the presence of an overpressure of a gas, such as nitrogen.

EXAMPLE

In order to prepare batches for pressing of powder compacts $Si_3N_4$ powder (amorphous), plus 5 weight percent of MgO, was mixed with toluene, methanol and magnesium stearate in the amounts shown in Table I with or without 300 ppm Ti in form of TiN.

TABLE I

| | |
|---|---|
| $Si_3N_4$ + (5 w/o MgO) | 68 g |
| Toluene | 159.8 g |
| Methanol | 5.44 g |
| Magnesium stearate | 2.04 g |

The batches were then thoroughly mixed by milling in a two quart polyethylene jar with about 2,000 grams of a grinding media for ½ hour. The resulting slurry was dried at about 105° C. and the dried batch was dry ball milled in a polyethlene jar for 24 hours. To this dry ball milled batch was added 2.04 grams of carbowax, 68 grams of toluene, and 2.04 grams of methanol. It was mixed by ball milling for 15 minutes. The resulting slurry was dried at 105° C. and screened through a 60 mesh screen. The minus 60 mesh fractions were pressed at 25,000 psi to obtain green powder compacts. The magnesium stearate and carbowax binders were then removed by heating the compacts at the rate of about 50° C. per hour to a temperature of about 600° C. and maintained at the temperature for about 4 hours in air.

Compacts were then sintered for 1.5 hours at 1600°, 1650°, 1670° and 1700° C., respectively, and evaluated by measuring density. Results are depicted graphically in the drawing. The FIGURE shows the effect of Ti addition on densification at temperatures ranging from 1600° to 1700° C. and illustrates improved densification of material containing Ti.

Utilization of Ti addition in the system containing amorphous silicon nitride 20 weight percent $Y_2O_3$ has resulted in a sintered body having 98% of theoretical density.

While there has been shown and described what are present considered the preferred embodiments of the invention, it will be obvious to those skilled in the art that various changes and modifications may be made therein without departing from the scope of the invention as defined by the appended claims.

I claim:

1. A powder mixture consisting essentially of amorphous $Si_3N_4$ powder of average particle size below about 3 microns characterized in that the $Si_3N_4$ powder contains about 100 to 1000 parts per million Ti.

2. The powder mixture of claim 1 in which the $Si_3N_4$ powder consists of up to 5 weight percent crystalline $Si_3N_4$, remainder substantially amorphous $Si_3N_4$.

3. The powder mixture of claim 1 additionally containing up to 25 weight percent of at least one additive selected from the group consisting of MgO, CrN, $Y_2O_3$, $HfO_2$, $ZrO_2$, ZrN, $La_2O_3$, $CeO_2$, $SiO_2$ and $Al_2O_3$.

4. A powder compact of the powder of claims 1, 2 or 3.

5. The powder compact of claim 4 in which a volatilizable additive is present.

6. A polycrystalline body of $Si_3N_4$ obtained by the pressureless sintering of the compact of claim 4.

* * * * *